United States Patent [19]
Camilleri

[11] Patent Number: 4,669,936
[45] Date of Patent: Jun. 2, 1987

[54] BACK CLIP

[75] Inventor: Charles F. Camilleri, St. Louis, Mo.

[73] Assignee: Lee-Rowan Company, St. Louis, Mo.

[21] Appl. No.: 783,158

[22] Filed: Oct. 2, 1985

[51] Int. Cl.⁴ ............................. F16L 3/08; F16L 3/12
[52] U.S. Cl. ...................................... 411/340; 24/543; 248/250
[58] Field of Search ................................. 411/340-346, 411/57, 29, 60, 61, 71, 72, 394, 41, 38; 248/489, 250, 25 P; 24/453

[56] References Cited

U.S. PATENT DOCUMENTS

| | | | |
|---|---|---|---|
| 2,033,100 | 3/1936 | Kellogg | 411/72 |
| 2,555,420 | 6/1951 | Richardson | 411/72 |
| 3,188,905 | 6/1965 | Millet | 411/57 |
| 3,431,813 | 3/1969 | Johnson | 411/71 |
| 4,022,100 | 5/1977 | Johnson | 411/57 |
| 4,124,189 | 11/1978 | Einhorn | 248/489 |
| 4,264,047 | 4/1981 | Nelson | 248/73 |
| 4,274,324 | 6/1981 | Giannuzzi | 411/38 |
| 4,312,614 | 1/1982 | Palmer et al. | 411/41 |
| 4,361,099 | 11/1982 | Kokenge et al. | 248/250 |

FOREIGN PATENT DOCUMENTS

| | | | |
|---|---|---|---|
| 4919 | of 1893 | United Kingdom | 411/394 |
| 1226 | of 1910 | United Kingdom | 411/394 |
| 1299592 | 12/1972 | United Kingdom | 248/71 |

Primary Examiner—James L. Ridgill, Jr.
Attorney, Agent, or Firm—Rogers, Howell, Moore & Haferkamp

[57] ABSTRACT

A back clip comprising a clip body and a drive pin. A wall anchor is integral with the clip body and has fingers laterally expandable when the drive pin is driven through the anchor. The fingers have transverse wall portions engageable by the drive pin to swing the fingers to substantially ninety degree angles to the axis of the drive pin and anchor. A web is in front of the transverse wall portions in the path of the drive pin. A hook member on the body receives a shelf wire. A stop is hinged to the body by an integral short plastic strap and is pivotable to block the open side of the hook member and to hide the head of the drive pin.

16 Claims, 6 Drawing Figures

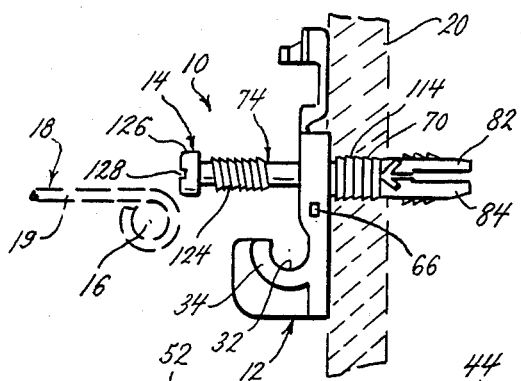
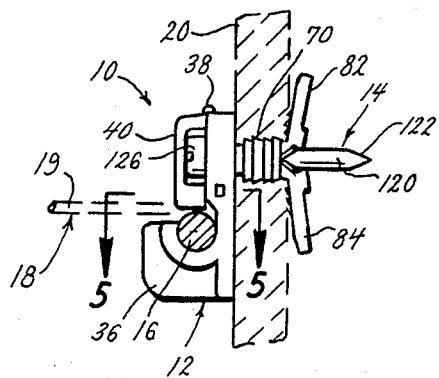
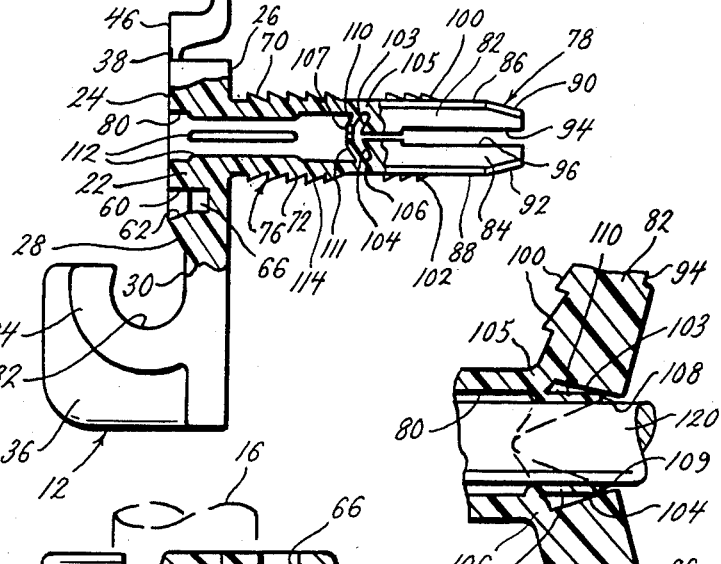
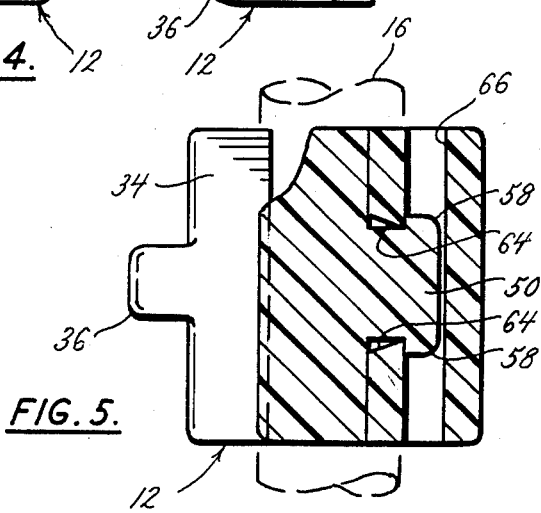

BACK CLIP

BACKGROUND OF THE INVENTION

This invention relates to a back clip and particularly to a back clip for connecting an edge of a shelf to a wall.

Devices for attaching shelves to walls are numerous in form and configuration. These devices include some that are similar to the back clip of the present invention insofar as the existing back clips have been of molded plastic having a body with a wall anchor extending from it and with a wire engaging hook formed in it. In some of the existing devices, the wall anchor is of the kind having laterally expandable fingers that are expanded against the back side of a wall when a pin is extended through the wall anchor.

However, in spite of the myriad of devices for attaching shelves to walls, including a wide variety of clips, none incorporate the combination of features of the present invention as will be described.

SUMMARY OF THE INVENTION

This back clip comprises a unitary molded plastic clip body and a steel drive pin. The clip body is formed with a back section having a wall contact surface and a front surface. A wall anchor extends from the wall contact surface. The wall anchor has a body section with rings on it. Laterally expandable fingers are joined to the rear of the body section by thin plastic connectors that act as hinges. The body section is molded with the fingers straight and together. Therefore, it is not necessary to squeeze the fingers together to insert them into a pre-drilled hole in a wall. The laterally expandable fingers include transverse wall portions in the path of a passage through the body section so that when a drive pin is driven through the body section, its lead end will contact the transverse walls and, through a camming action, spread the fingers into laterally extending positions, and hold them there.

The transverse walls are preferably inclined inwardly and toward the head of the socket so that the pin will pivot the fingers as far outwardly as possible toward ninety degree projections relative to the axis of the passage.

A special feature of this invention is the provision of a web slightly spaced from the transverse walls. There is a small opening through the web, such as a slit. Without the web, a stress line would be formed during molding, the end of the core forming the passage where that core intersects the transverse walls. By providing the web, the location of the stress line is moved to the intersection of the core and the web, and the walls joining the web and the transverse walls can be formed rounded with no stress lines. This avoids failure at the pivot lines of the fingers that might result from stress lines.

The web performs another function. As the drive pin is driven through the passage, it first contacts the web and, because the slit is parallel to the pivot lines of the fingers, the pin will split the web and pivot its halves toward the fingers. Thereafter, when the pin cams the fingers outwardly, the web halves lie against the pin and present edges opposing a tendency of the transverse walls to slide back along the pin. The rings on the body section are sawtooth in side view to enable the body section to be pressed into a hole in a wall but the forward-facing edges of the rings are substantially radial to the body so that they resist removal of the wall anchor from the hole in the wall to a maximum degree.

On the clip body, The lower portion of the back section is formed with a hook member that has an open side facing upwardly to receive a wire or rod of a shelf. A stop is joined to the back wall by an integral thin plastic member that acts as a hinge. The stop has a projection on it with lateral flanges. It also has a recess in it. The back section has a specially designed recess for receiving the projection on the stop. Therefore, when the stop is pivoted about its hinge, the recess in the stop will receive the head of the pin. The length of the stop is such that, when locked in place with the projection in the recess, the stop is positioned across the open side of the hook member. In this position, the stop positively blocks release of the shelf wire from the hook member and at the same time covers the head of the drive pin.

BRIEF DESCRIPTION OF THE DRAWINGS

FIG. 1 is a side elevation view of the back clip partially installed on a wall;

FIG. 2 is a side elevation view of the back clip as installed on a wall;

FIG. 3 is an enlarged side elevation view of the back clip with parts shown in section;

FIG. 4 is an enlarged front elevation view of the back clip;

FIG. 5 is an enlarged top plan view in section through the recess in the clip body taken along the plane of the line 5—5 of FIG. 2; and FIG. 6 is an enlarged view in medial section of the central portion of the socket showing the web with the pin driven through it.

DETAILED DESCRIPTION OF THE PREFERRED EMBODIMENT

Referring to the drawings, and particularly to FIG. 1, this back clip 10 comprises a clip body 12 and a drive pin 14 that cooperate to support a wire or rod 16 of a shelf 18 to a wall 20. The shelf 18 is of the kind that has a plurality of spaced smaller wires 19 to define a horizontal support upon installation of the shelf. The smaller wires 19 are wrapped about the wire or rod 16 and supported by one or more similar wires or rods (not shown) spaced from and parallel to the wire 16.

The clip body 12 is shown in more detail in FIGS. 3-6. It comprises a unitary plastic member that includes a back section 22 having a front face 24 and a rear face 26. Below its center, the front face 24 has a span 28 that is inclined downwardly and rearwardly, terminating in a short vertical wall 30. The wall 30 leads to a radial hook face 32 formed in a hook extension 34 that projects forwardly from the back section 22. Preferably a central reinforcing web 36 is molded to and extends between the underside of the hook member 34 and the lower portion of the back section 22.

A short thin plastic member 38 extends upwardly from the top of the back wall 22 and connects the back wall 22 to a stop 40. The stop 40 has an outer surface 42 and opposite thereto, coplanar inner surfaces 44 and 46 that are spaced from one another by a recessed section 48. The recessed section 48 is slightly larger than the head of the drive pin 14.

It will be noted that the thin plastic member 38 normally holds the stop 40 in the upright position shown in FIGS. 1 and 3. However, the plastic member 38 is bendable and serves as a hinge allowing the stop to be pivoted to the position shown in FIG. 2. It also should be observed that the plastic member 38 may be set back slightly from the faces 24 and 46. This allows these faces to make contact in the locked position of FIG. 2 without bending the plastic member 38 too sharply.

Extending from the face 44, there is a projection 50 having a tapered wall 52 and having laterally extending flanges 54 and 56 (see FIGS. 4 and 6). Preferably, the leading edges 58 of the projection 50 are rounded (see FIG. 5).

In the face 24 of the back section 22, there is a recess 60, with an inclined wall 62, complementary to the projection 50 and its inclined face 52. The recess also has tapered side walls 64 that make entrance to the recess easier (see FIG. 5). To accommodate the lateral flanges 54 and 56, another recess 66 communicates with the recess 60. For ease of molding, as known in the art, the recess 66 extends between and opens through the sides of the back wall 22. The span between the projections 54 and 56 is greater than the narrowest width of the recess 60, so the projections will snap into the transverse recess 66 thus providing interengaging means.

Integrally molded to and extending from the back wall 22 is a wall anchor 70. The wall anchor 70 comprises a socket 72 and a drive pin 74.

The socket 72 includes a body section 76, and a finger section 78. There is a passage 80 through and the body section 76 communicating with the finger section 78. The finger section 78 includes two fingers 82 and 84 having flat outer surfaces 86 and 88, respectively, terminating in tapered nose sections 90 and 92 at the lead end of the socket 72. Inwardly, the fingers 82 and 84 have opposed flat faces 94 and 96. Toward their trailing ends, the fingers 82 and 84 have barbs 100 and 102, respectively, that are sawtooth in side elevation as shown in FIG. 3.

The fingers 82 and 84 are formed with transverse walls 103 and 104 that extend across the passage 80 through the body section 76. Preferably, these walls 103 and 104 are inclined inwardly and toward the entrance to the passage 80 at angles of about 60°, to the axis of the passage 80. Immediately adjacent the walls 103 and 104, there are short hinge sections 105 and 106 molded as integral parts of the plastic socket 72 of generally the same thickness as that of the wall of the body section 76 of the socket. Spaced from the walls 103 and 104, a web 107 is formed integral with the socket 72. A slit across the width of the web 107 parallel to the faces 94 and 96 has opposed edges 108 and 109. The slit separates the web into halves 110 and 111 which are generally parallel to the walls 103 and 104. Although the intersection of the passage 80 and the web 107 can have stress lines, because of the presence of the web 107, the short hinge sections 105 and 106 can be unstressed and even rounded.

Referring to the body section 76, a plurality of longitudinally extending ribs 112 project inwardly on the inner wall of the passage 80. The primary purpose of these ribs 112 is to grip the shank of the drive pin 74 holding the pin 74 in a ready condition. In other words, the circumscribed internal diameter defined by the ribs 112 is slightly less than the diameter of the shank of the drive pin 74.

On the outer surface of the body section 76, there are a plurality of rings 114 that are generally sawtooth in side elevation. The outer diameters of the rings 114 are essentially the same as the span between the barbs 100 and 102 so that both the fingers 82 and 84 and the body section 76 of the socket 72 will fit in the same size hole in a wall 20.

In its preferred form, the drive pin 14 has a shank 120 with a point 122 on its lead end that can be round or pointed as a typical nail point. Generally, the lead section of the shank 120 is cylindrical like a nail, whereas the trailing section is formed with a double helix thread 124. The double helix thread 124 is sawtooth in side elevation so that the drive pin 14 can be driven, such as by a hammer, into a wall and can be rotated to withdraw it. For both of these purposes, there is a head 126 on the trailing end of the drive pin 14 with a screwdriver kerf or phillips head slot 128 in it. The diameter of the cylindrical shank 120 is about equal to the internal diameter of the passage 80, whereas the outer diameter of the helical threads 124 is greater than the diameter of the passage 80. Therefore, when the drive pin 14 is started into the passage 80 and pressed within the longitudinal ribs 112, the ribs 112 will grip the pin 14 and hold it in place. Because the socket 72 is plastic, it will yield, and the pin can be inserted manually.

Operation and Use

The drive pin 14 is pressed into the passage 80 until the leading portion of the shank 120 is pressed within the area of the ribs 62. These ribs 62 will hold the drive pin 14 in place. A hole should be drilled in the wall 20 of a diameter slightly greater than the diameter of the body of the socket 72, and less than the diameter of the rings 76. The socket 72 can then be pushed into the hole in the wall (the fingers not having to be squeezed together), and the rings 114 will hold it in place temporarily (see FIG. 1). Now, a hammer can drive against the head 126 of the drive pin 14. As the drive pin 14 extends into the socket 80, it engages the transverse walls 103 and 104 of the fingers 82 and 84 and pivots the fingers toward the ninety degree orientations shown in FIG. 2. As illustrated in FIG. 6, the web halves 110 and 111 are not stretched along the shank 120 of the pin 74, placing their edges 108 and 109 in positions to help hold the fingers 82 and 84 in their spread positions. The barbs 100 and 102 grip the wall surface as shown in FIG. 2.

After the wall clip is installed on a wall, the shelf until 18 can be set in place with the wire 16 resting on the hook surface 32. Since the normal position of the stop 40 is upwardly projecting, it stands out of the way of interference with the introduction of the wire 16 into the hook 32. Thereafter, using manual pressure, such as by a thumb, the stop 40 can be pivoted toward the position shown in FIG. 2. As the stop 40 approaches that position, the projection 50 will enter the recess 60. Because of the tapered side walls 64, the flanges 54 and 56 enter the recess 60 readily. As the side walls 64 narrow, the resistance increases, but the plastic yields and allows the flanges 54 and 56 to snap into the recess 66. This positively locks the stop 40 in the position shown in FIG. 2. In this position, the stop overlies the opening of the hook 32 and blocks escape of the wire 16. In addition, the head 126 of the drive pin 14 is received within the recess 48 and is covered from view by the stop 40.

Should it be desired to remove the shelf and wall clip, the stop 40 can be pried to free the projection 50 and its lateral flanges 54 and 56 from the recesses 66 and 60. Then the shelf rod 16 can be lifted from the hook 32. Thereafter, the drive pin 14 can be rotated by a screwdriver in a direction that will cause the threads 124 to withdraw the drive pin from the socket 72. Once the drive pin has cleared the faces or walls 103 and 104 of the fingers 82 and 84, they can pivot back to the straight positions shown in FIG. 1, and the socket 72 can be withdrawn from the hole in the wall.

There are various changes and modifications which may be made to this invention as would be apparent to those skilled in the art. However, any of these changes or modifications are included in the teaching of this disclosure and this invention is limited only by the scope of the claims appended hereto.

What is claimed is:

1. A back clip to support a portion of a shelf or the like comprising, a clip body, means including a pin to attach the clip body to a mounting surface, a hook formed as an integral part of the clip body, the hook having an open side for receiving a portion of a shelf or the like and having a closed side against which the portion bears after passing through the open side, a blocking member, hinge means joining the blocking member to the clip body at a point spaced from the open side of the hook and enabling the blocking member to pivot about the hinge means from a first position extending away from the body to a second position toward the hook and alongside the clip body, a projection on the blocking member, a recess in the clip body complementary in size and shape to the projection to receive the projection and lock the blocking member in the second position obstructing the open side of the hook, the clip body having a face adapted to rest against the mounting surface, a tubular member integral with the body and extending from the face and having a free end spaced from the body, a passage through the tubular member, a pair of fingers each having one end pivotally joined to the free end of the tubular member and having an opposite end free from connections so that the fingers can be spread by driving the pin between them, the fingers extending away from the body normally together and parallel to one another so that it is not necessary to squeeze the fingers together to insert them into a hole in a wall, the pin extending through the passage, a head on the pin larger than the diameter of the passage to limit extension of the pin into the passage, the pin being longer than the tubular member so that it projects between the fingers when the head contacts the clip body, the span of the area between the fingers being less than the diameter of the pin so that the fingers are spread upon entry of the pin into the area between the fingers.

2. The back clip of claim 1 wherein the recess has an entrance with tapered side walls converging in a direction away from the entrance and terminating at an enlarged area of the recess, and wherein the projection has lateral flanges, the span between the lateral flanges being greater than the narrowest span between the side walls and being less than the widest span between the side walls, the enlarged area of the recess being wide enough to receive the lateral flanges.

3. The back clip of claim 1 wherein the blocking member is at least as wide as the head whereby the blocking member obscures the head when the blocking member is in the second position, and the hinge means comprises a thin plastic member integral with the clip body and the blocking member that normally holds the blocking member in the first position.

4. The back clip of claim 3 wherein the blocking member has a recess in it for receiving the head when the blocking member is in the second position.

5. The back clip of claim 1 wherein the fingers have walls normally transverse to the axis of the passage and in the path of the pin for engagement by the pin to pivot the fingers laterally outwardly.

6. The back clip of claim 5 including longitudinal ribs on the clip body projecting inwardly of the passage to grip the pin.

7. The back clip of claim 5 including a web projecting into the passage in the path of the pin as it approaches the walls of the fingers, the web being integral with the socket and being distinct from the walls of the fingers.

8. The back clip of claim 7 including a slit in the web separating the web into two portions, the web extending generally across the passage, the two web portions being joined to a circumference of the passage at locations adjacent the hinge means.

9. The back clip of claim 7 wherein the web is spaced from the walls of the fingers.

10. The back clip of claim 6 wherein the pin has a leading end and a trailing end, a point on the leading end, a generally cylindrical shank portion adjacent the point and terminating intermediate the leading end and the trailing end and being longer than the ribs, and helical threads between the cylindrical shank portion and the trailing end, the maximum diameter of the threads being greater than the diameter of the passage.

11. The back clip of claim 10 wherein the threads are defined by leading surfaces at less than 45° to the axis of the pin to allow driving of the pin into the passage and trailing surfaces at greater than 45° to the axis of the pin to grip the wall of the passage and resist withdrawal of the pin except upon rotation of the pin, a head on the trailing end of the pin to facilitate driving the pin with a hammer, and a kerf in the head to receive a screwdriver to rotate the pin.

12. The back clip of claim 11 wherein the trailing surfaces are at about 90° to the axis of the pin.

13. The back clip of claim 7 wherein the walls of the fingers are inclined inwardly and toward the trailing end.

14. The back clip of claim 13 wherein the angle of inclination is between about 55 degrees and about 65 degrees to the axis of the passage.

15. The back clip of claim 13 wherein the web has portions are generally parallel to the walls of the fingers.

16. A back clip comprising a clip body having a front and a back, means to attach the clip body to a wall, a hook extending from the front of the clip body, the hook having an open side facing generally upwardly, a stop, hinge means for connecting the stop to the clip body at a point enabling the stop to pivot between a first position at which the stop is remote from the open side of the hook and a second position at which the stop is positioned to block the open side of the hook, and interengageable means on the clip body and the stop to lock the stop in the second position.

* * * * *